United States Patent [19]
Bayazit et al.

[11] Patent Number: 6,094,232
[45] Date of Patent: Jul. 25, 2000

[54] METHOD AND SYSTEM FOR INTERPOLATING A MISSING PIXEL USING A MOTION VECTOR

[75] Inventors: Ulug Bayazit, Sunnyvale, Calif.; Mikhail Tsinberg, Riverdale, N.Y.

[73] Assignee: Kabushiki Kaisha Toshiba, Kawasaki, Japan

[21] Appl. No.: 09/199,423

[22] Filed: Nov. 25, 1998

[51] Int. Cl.[7] ....................................................... H04N 5/21
[52] U.S. Cl. ............................ 348/616; 348/620; 348/452
[58] Field of Search ..................................... 348/616, 617, 348/620, 452, 448; H04N 5/21, 7/01

[56] References Cited

U.S. PATENT DOCUMENTS

| | | |
|---|---|---|
| 4,789,893 | 12/1988 | Weston . |
| 5,280,350 | 1/1994 | DeHaan et al. . |
| 5,532,750 | 7/1996 | DeHaan et al. . |
| 5,689,305 | 11/1997 | Ng et al. . |
| 5,777,682 | 7/1998 | DeHaan et al. . |

OTHER PUBLICATIONS

Gerard De Haan "Deinterlacing–An Overview" Proceedings of the IEEE, vol. 86, No. 9, Sep. 1998, pp. 1872–1845.

*Primary Examiner*—Sherrie Hsia
*Attorney, Agent, or Firm*—Finnegan, Henderson, Farabow, Garrett & Dunner, L.L.P.

[57] ABSTRACT

A method and system for interpolating a missing pixel in a current field of an interlaced video format signal. The method includes performing a low-pass estimate in the current field about the missing pixel. A high-pass estimate is also performed in a temporally local field to the current field. The high-pass estimate is performed in the temporally local field at a position connected to the missing pixel by a motion vector. The value of the missing pixel is then determined by combining the high pass estimate with the low-pass estimate performed in the current field.

9 Claims, 9 Drawing Sheets

MOTION VECTOR v ESTABLISHING CORRESPONDENCE BETWEEN PIXEL LOCATIONS a AND c, b AND f, AND c AND g. ALTHOUGH NOT SHOWN HERE THE SAME CORRESPONDENCE MAY BE ESTABLISHED BY A MOTION VECTOR POINTING FROM THE CURRENT FIELD TO THE NEIGHBORING FIELD.

HIGH LEVEL SYSTEM BLOCK DIAGRAM SHOWING THE INTERCONNECTIONS AND DATA FLOW BETWEEN THE PROPOSED INTERLACED-TO-PROGRESSIVE CONVERSION SYSTEM AND OTHER FUNCTIONAL COMPONENTS

METHOD AND SYSTEM FOR INTERPOLATING A MISSING PIXEL USING A MOTION VECTOR

BACKGROUND OF THE INVENTION

The present invention relates to a method and apparatus for interpolating missing lines of pixels from a video signal.

Broadcast signals today are sent and received as interlaced signals comprised of alternating fields of odd and even lines. An interlaced screen displays only one field at a time with a high (60 Hz. NTSC, 50 Hz. PAL/SECAM) temporal frequency. Due to its signal decay characteristics and the persistence of vision, the field perceived at the current time instant is overlaid onto the field perceived at the previous time instant in the human brain. These two fields, however, do not match temporally, and signal elements of the two signals may have moved between frames.

Interlaced to progressive conversion avoids this problem by interpolating the missing lines at each time instant from the lines of the received fields. Received and interpolated lines are simultaneously displayed on a progressive display screen. One method of interpolating a pixel of a missing line is to use the signal elements of the pixels vertically local to that pixel. Such a method of (intrafield) interpolation by lowpass estimation operates as a one-dimensional ("1-D") low-pass filter. Unless the vertical frequency of the signal is very low, this method severely limits the vertical resolution of the signal, and may cause undesirable spatial blurring of the vertical edges or temporal flicker.

Another solution would be to temporally interpolate the values of the pixels of missing lines. The simple method of temporal interpolation by adjacent field pixel substitution would use the same pixel elements from the preceding and following fields to interpolate the value of the missing pixel. Here, unless the temporal change in the signal is low, this method severely limits the resolution of the movement of the signal, but does not help increase the vertical resolution.

A combination of these two methods such as averaging their outputs can also be used. However, both the resolution of movement in the signal and the vertical resolution of the signal are deteriorated by this method.

Known motion adaptive conversion methods provide a means for hard or soft switching between intrafield low-pass estimation and adjacent field pixel substitution. This solution generally works well since pixel substitution preserves vertical detail for stationary regions in the video signal, and loss of fine vertical detail due to intrafield estimation is not noticeable for fast moving regions. However, neither intrafield low-pass estimation nor adjacent pixel substitution is suitable for the de-interlacing of slow moving regions in the video where the eye can detect the blur caused by the intrafield low-pass estimation.

Another method of temporal interpolation is referred to as motion compensated filtering which makes use of pixels in the preceding or succeeding frames and estimates the missing pixels by applying a low-pass filter along the direction of motion. The motion vector estimates used for determining the direction of motion need to be consistently accurate and those decoded in the systems of conventional coding standards, for transmission of digital video, are of limited use due to their lack of robustness in the presence of motion estimation errors.

U.S. Pat. No. 4,789,893 to Weston introduced a combined spatio-temporal interpolation technique. Weston interpolates a given missing pixel by combining the above mentioned intrafield low-pass estimate with high-pass estimates from temporally adjacent fields. For each missing pixel, there is a directly preceding pixel, and a directly following pixel in the opposite polarity adjacent field. High-pass estimates are obtained from the adjacent fields by vertically operating a 1-D high-pass filter centered at the directly preceding and directly following pixels. This leads to some loss in vertical high frequency detail for moving regions and some gain in vertical high frequency detail for stationary regions with respect to the intrafield low-pass estimate. One drawback with this method is that for those moving objects which the eye can track, there will be a discernable loss in vertical detail for those objects that have fine vertical high frequency detail.

SUMMARY OF THE INVENTION

The method and apparatus of the present invention overcome the prior art problems discussed above by compensating for motion between fields which are temporally close to each other before combining the temporally local field high-pass estimate with the intrafield low-pass estimate. Temporally local fields are defined as fields separated by one or more field-to-field temporal distances from the current field being converted.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method of interpolating a value of a missing pixel from an interlaced format video signal, comprising the steps of: performing a low-pass estimate in a current field centered at the missing pixel; using a motion vector pointing to or from the missing pixel to find a pixel location of a temporally local field; performing a high-pass estimate in the temporally local field centered at said pixel location of the temporally local field; combining the low-pass estimate with the high-pass estimate to determine a combined estimate; and using the combined estimate as the value of the missing pixel.

It is to be understood that both the foregoing general description and the following detailed description are exemplary and explanatory only and are not restrictive of the invention, as claimed.

The accompanying drawings, which are incorporated in and constitute a part of this specification, illustrate several embodiment of the invention and together with the description, serve to explain the principles of the invention.

DESCRIPTION OF THE PREFERRED EMBODIMENT(S)

Reference will now be made in detail to the present preferred embodiments of the invention, examples of which are illustrated in the accompanying drawings. Wherever possible, the same reference numbers will be used throughout the drawings to refer to the same or like parts.

Figure 1:
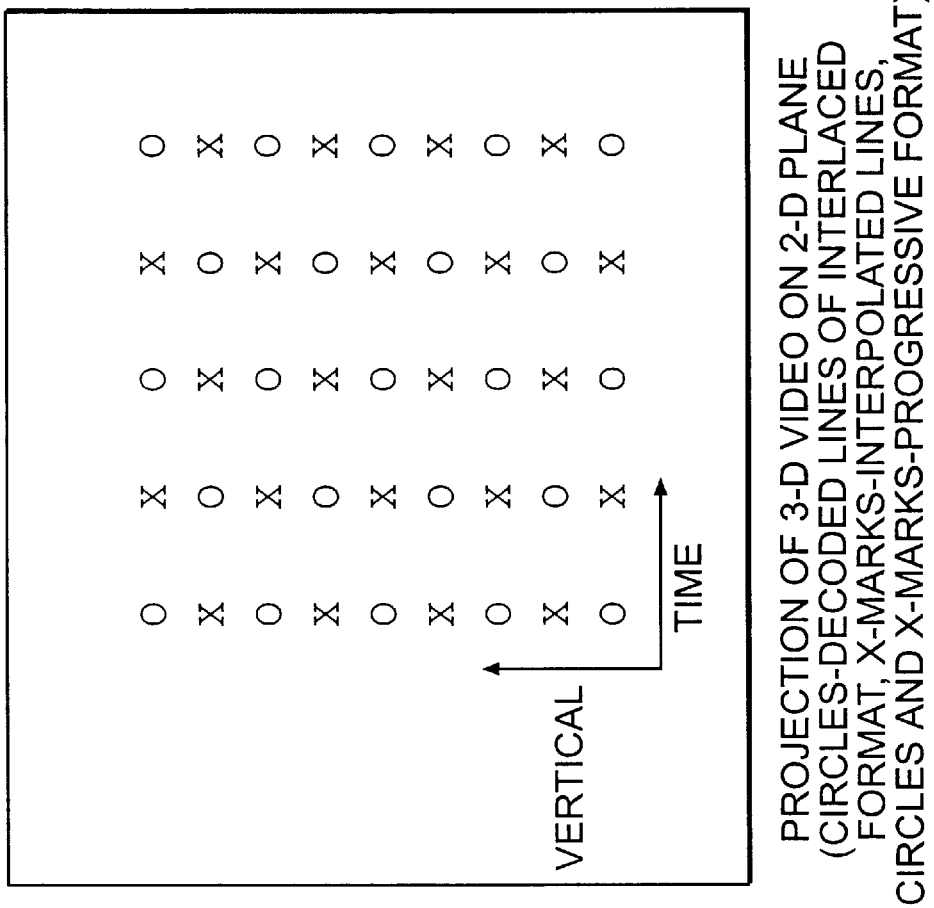
FIG. 1 is a graph showing the interlaced nature of an interlaced video signal.

FIG. 1 shows the basic relation of signal elements of the present invention. The vertical lines relate to a one-dimensional vertical column of pixel elements of a video signal. The circles of FIG. 1 relate to the interlaced pixel elements which have been decoded from the incoming signal. The x-marks relate to the pixel elements which must be interpolated by method and apparatus constructed according to the present invention. Pixel elements which are shown horizontally adjacent to one another are the same vertical pixel element either in the future (to the right) or in the past (to the left) in the progression of the video signal.

As discussed above with regard to the Weston method of pixel interpolation, there are two basic interpolation methods, an intrafield low-pass estimate, and a high-pass estimate from temporally local fields.

Figure 2:
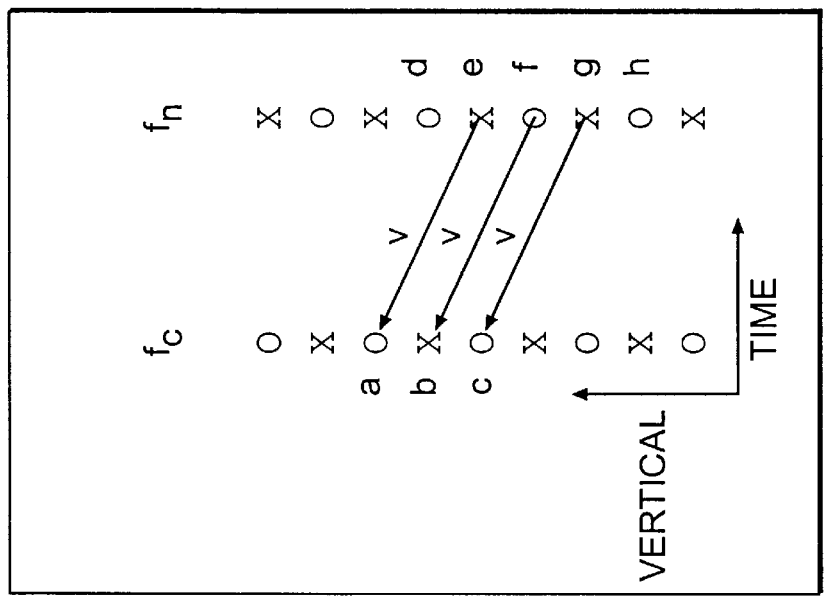
FIG. 2 is a graph showing how a motion vector connects pixels of a current field $f_c$ with the pixels of a temporally local field $f_n$.

The information in a current field $f_c$ can be exploited by forming an intrafield low-pass estimate from the pixels vertically local to the given pixel to be interpolated. A lowpass estimate is the output of a 1-D low-pass filter, vertically applied and centered at the missing pixel in current field $f_c$. FIG. 2 shows a current field $f_c$ and a temporally local field $f_n$, both of which are made up of interlaced video signals. As an exemplary intrafield low-pass estimate, missing pixel at location b, as shown in FIG. 2, can be interpolated using pixels at locations a and c. An example of an equation for a 1-D intrafield low-pass estimate performed as the output of a 1-D low-pass filter vertically applied and centered at location b is:

$$\hat{I}^L_b = (I_a + I_c)/2 \tag{1}$$

where: $\hat{I}^L_b$ is the low-pass estimate of the intensity value of missing pixel at location b; $I_a$ is the intensity value of the pixel at location a (the pixel directly above pixel at location b); and $I_c$ is the intensity value of pixel at location c (the pixel directly below pixel at location b). The tap weights of this exemplary low-pass filter are (0.5, 0.5). This low-pass filter is given only as an example, and the use of other low-pass filters with greater or fewer taps and different frequency characteristics is also envisioned.

The information from at least one temporally local field $f_n$ can also be exploited by performing a high-pass estimate within the one or more chosen fields. A high-pass estimate is the output of a 1-D high-pass filter, vertically applied and centered at a chosen location in temporally local field $f_n$. An example of a factor used to apply a 1-D high-pass filter as implemented in a preferred embodiment of the present invention to determine the high-pass estimate $\hat{I}^H_b$ is:

$$\hat{I}^H_b = G(-I_d/2 + I_f - I_h/2) \tag{2}$$

where: G is the gain or weight given to the estimate; and $I_d$, $I_f$, and $I_h$ are the intensities of pixels at locations d, f, and h respectively, as shown in FIG. 2. The tap weights of the exemplary high-pass filter are (–0.5 G, G, –0.5G). The above high-pass filter is given only as an example, and the use of other high-pass filters with greater or fewer taps and different frequency characteristics is also envisioned.

An equation for an estimate for $I_b$, as the combination of a 1-D intrafield low-pass estimate and a 1-D high-pass estimate from one chosen temporally local field is $$\hat{I}_b = \hat{I}^L_b + \hat{I}^H_b \tag{3}$$

The formation of the above estimate is given only as an example. The combination of high-pass estimates from other chosen temporally local fields with the above estimate is also envisioned.

In performing such a high-pass estimate, two issues arise. First is the need to determine which of the fields temporally local to the current field is to be used for the high-pass estimate. Second is the need to determine which location within the temporally local field is to be used as the center of the high-pass filter to perform the high-pass estimate. The present invention resolves these issue by use of a motion vector.

As disclosed in The Electrical Engineering Handbook, published by the CRC, press in 1997, a motion vector is a calculated value which takes into account the frame-to-frame displacement of an object that moves within a signal sequence. The motion vector relates individual pixels, or groups of pixels, within a current frame or field to pixel locations within a temporally local frame or field. In conventional television signal processing, the motion vector is calculated using an adaptive prediction algorithm, and is included as part of the video signal. The motion vector has three dimensions: x coordinate, y coordinate, and time coordinate, which can be used to relate individual pixels of a current frame or field to individual pixels of a temporally local frame or field, as shown in FIG. 2.

International video coding standards such as MPEG or H26x use block matching algorithms for motion estimation/compensation where the displacement of a block of pixels is commonly estimated, and represented by a single motion vector for the sake of keeping the motion vector rate low in the coding process. As shown in FIG. 2, such a motion vector v relates the decoded pixel at location e to the decoded pixel at location a such that either a=e+v, when it points from e to a, or e=a+v, when it points from a to e. Similarly motion vector v relates location g to location c such that either c=g+v or g=c+v. The correspondence between locations b and f is established by translating v up or down by one frame pixel so that either b=f+v or f=b+v.

Using the motion vector v, the pixel interpolation system will perform a high pass estimate within the temporally local field $f_n$. The pixel interpolation system can then combine the value of an already calculated low-pass estimate with the value of the high pass estimate using chosen weights for each of these values. This combined estimate is then used as the value for the missing pixel.

Figure 6:
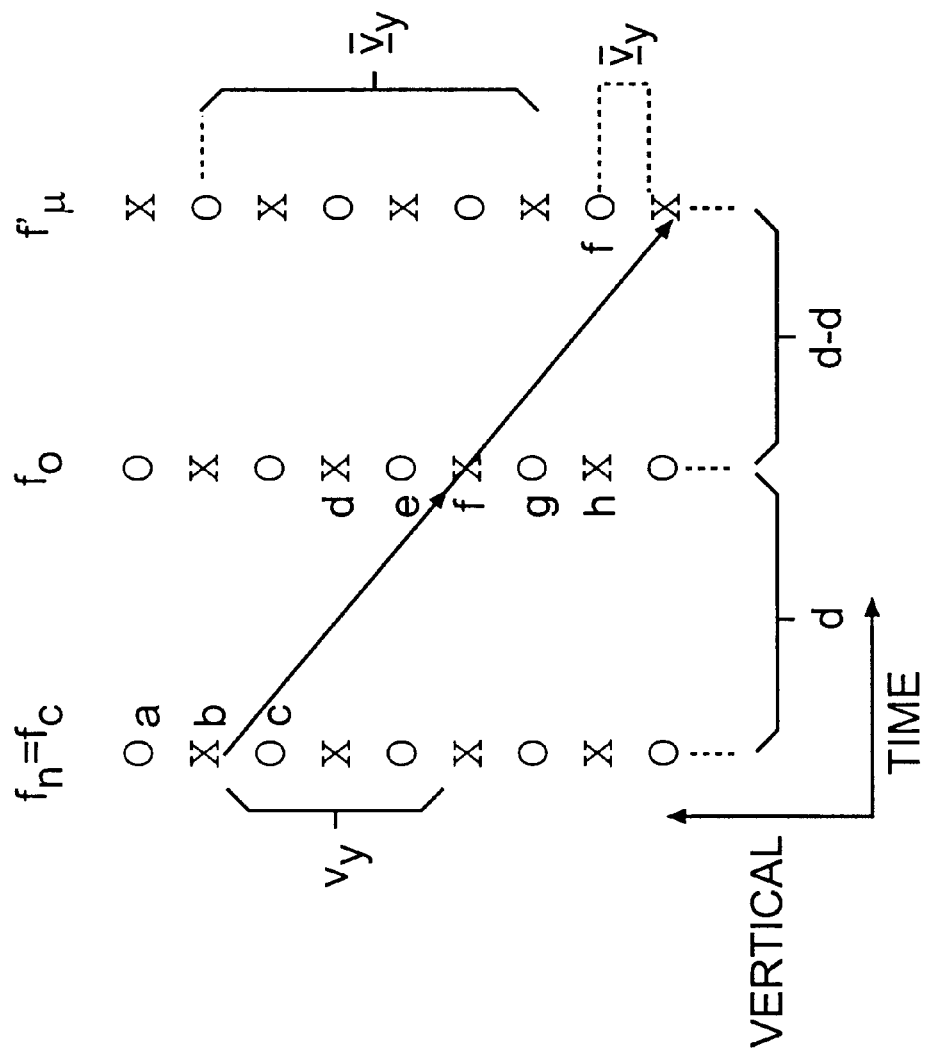
FIG. 6 is a graph showing how a motion vector can be extended into a temporally adjacent field.

Certain problems can arise, however, in the performance of the high pass estimate calculation. A first problem is finding that a motion vector that points to or from a missing pixel is either missing or unreliable. A second problem is finding that the pixel location in the temporally local field to which or from which the motion vector points, is also a missing pixel. This problem is shown in FIG. 6, where for missing pixel b, motion vector v points to another missing pixel f, rather than to a pixel location containing information.

Figure 3:
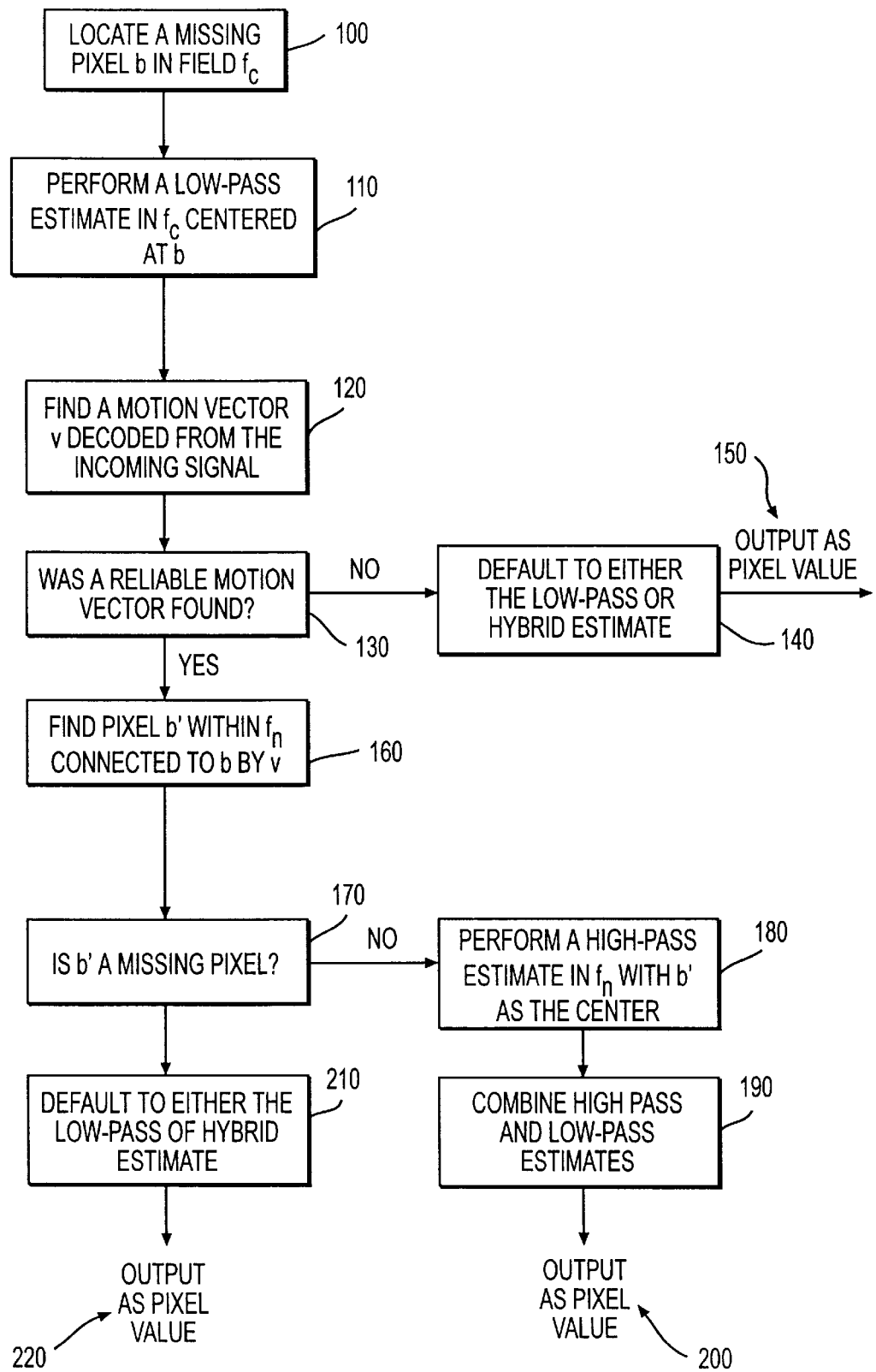
FIG. 3 is a flow chart showing a first exemplary embodiment of a method in accordance with the present invention.

A first embodiment of a method in accordance with the present invention is illustrated by the flowchart in FIG. 3. The system components for the performance of this method are not discussed here individually, but are instead introduced later in the disclosure as physical components for the performance of the method. It should also be noted that a computer program that performs the following steps is also a system in accordance with the present invention.

The first step 100 in this embodiment is to locate a missing pixel b in the current field $f_c$. A low-pass estimate is then performed for the pixel at location b within $f_c$ in step 110, using this pixel as the center of the vertically applied 1-D low-pass filter.

The system, in step 120, then finds a motion vector v from the decoded incoming signal. In step 130, the system must decide if a reliable motion vector v was found. If a reliable motion vector v was not found, the system defaults in step 140 to one of the known methods of pixel interpolation. These interpolation methods include the already completed low-pass estimate and the spatio-temporal estimate disclosed in Weston. In step 150, this value is then used as the value of the interpolated pixel.

If, however, there is a reliable motion vector v, in step 160 the system locates pixel b' within temporally local field $f_n$ connected to missing pixel b by motion vector v. The system must then check in step 170 if pixel b' is also a missing pixel. If b' is not a missing pixel, in step 180 a high-pass estimate is performed as the output of a 1-D high-pass filter vertically applied within temporally local field $f_n$ using location b' as the center for the high-pass filter. In step 190, the system then combines the high pass estimate from step 180 with the low pass estimate from step 110 using appropriate weights for the two estimates. This combined estimate is then output as the pixel value in step 200.

If, however, pixel b' is a missing pixel, it can not be used as the center for the high pass estimate. The system defaults in step 210 to one of the known methods of pixel interpolation, which include the already calculated low-pass estimate in the current field and the spatio-temporal estimate disclosed in Weston. In step 220, this value is then used as the value of the interpolated pixel.

Figure 4:
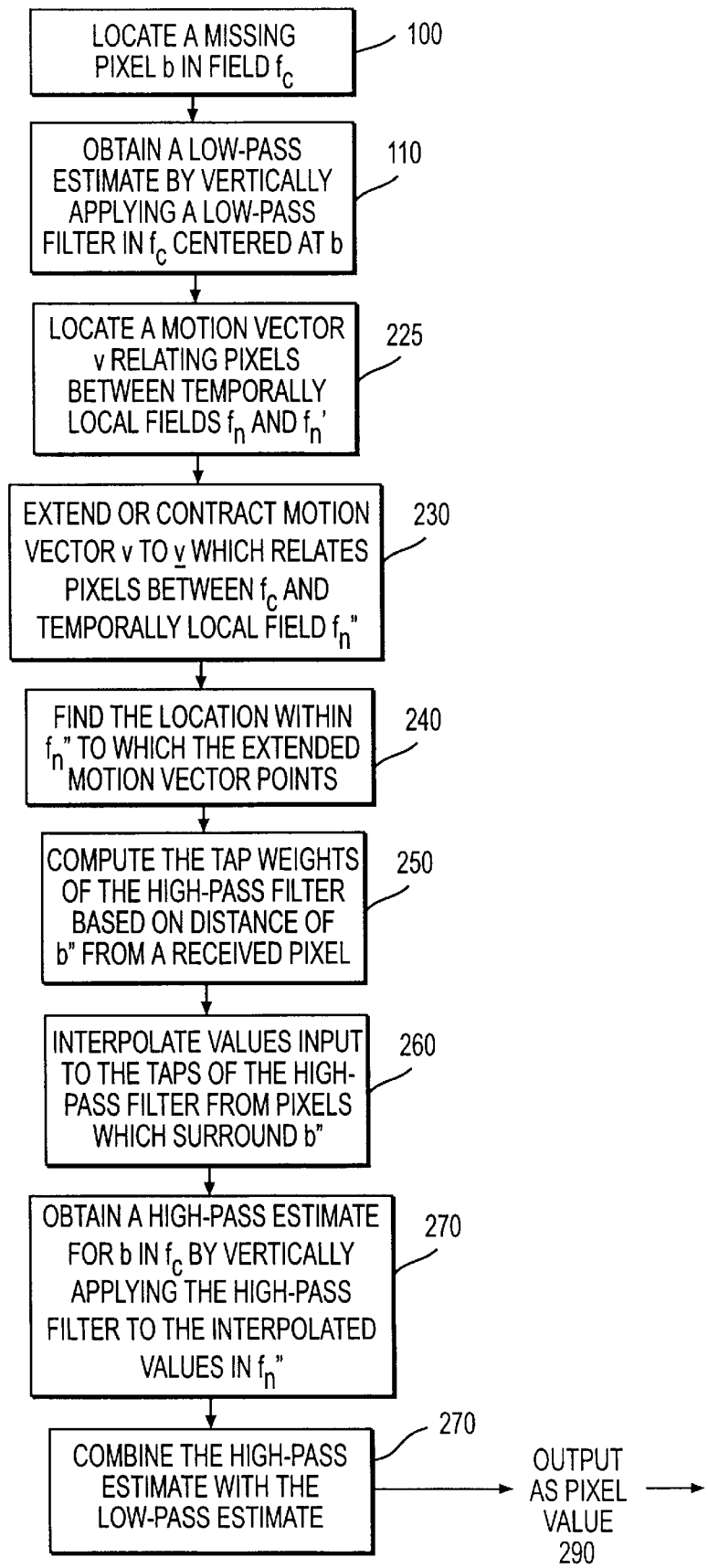
FIG. 4 is a flow chart showing a second exemplary embodiment of a method in accordance with the present invention.

A second embodiment of the present invention is shown in FIG. 4. The same steps to those shown in FIG. 3 share the same reference numbers.

The second embodiment locates a missing pixel at location b in field $f_c$, as in step 100, and performs a low-pass estimate in $f_c$, centered at b as in step 110 of the first embodiment. A motion vector v is then located in step 225 which relates any two locations in the two fields $f_n$ and $f_n'$ (either one can be $f_c$) temporally local to field $f_c$ and the straight line through these two locations in $f_n$ and $f_n'$ passes near or through the missing pixel at location b in field $f_c$. A new, extended or contracted motion vector v relates the missing pixel at location b in field $f_c$ and a location in the field $f_n''$ (which can be $f_n$ or $f_n'$) temporally local to field $f_c$. The system computes the ratio of the temporal distance (multiple of field-to-field temporal units) between the temporally local field $f_n''$ and the current field $f_c$ to the temporal distance between the two temporally local fields $f_n$ and $f_n'$.

It extends and/or contracts the motion vector v to the motion vector v in step 230 by scaling the x and y components of the motion vector v with this ratio.

The location b" to or from which this new extended and/or contracted motion vector v points within field $f_n''$ is determined in step 240. Due to scaling, however, it is likely that location b" is not a received pixel location, but instead is between pixel locations. An extension of a motion vector is shown in FIG. 6. The motion vector v in FIG. 6 does not point directly to or from a pixel location. The vertical component of the motion vector is shown extending into field $f_n'$. The extended motion vector points near received pixel location f, but not directly to it.

The tap weights of the vertically applied high-pass filter are computed in step 250 based on the proximity of b" to a received pixel location. The values input to the taps of the high-pass filter are interpolated from the pixel intensity values which surround b" in step 260. As in step 180, a high-pass estimate is performed at location b" in step 270, by the vertical application of the high-pass filter determined in step 250 to the interpolated values determined in step 260. In step 280, this high-pass estimate is combined with the lowpass estimate from step 110, and in step 290 the combined estimate is output as the pixel value.

Following is an exemplary mathematical explanation of how a motion vector can be extended, of how the tap weights of the high-pass filter can be computed based on the location that the motion vector points to or from, and what values are input to the taps of the filter. The variables are the same as those shown in FIG. 6.

Values d and d are defined as the temporal distance between fields $f_n$ and $f_n'$, and $f_n''$ and $f_c$ respectively. The scaled motion vector v can be obtained from motion vector v using the equation:

$$v = (vd)/d = (v_x, v_y)^T \quad (4)$$

It is important to note that $v_x$, $v_y$, the horizontal and vertical components of v, may have fractional parts due to the scaling even when the horizontal and vertical components of v are integers.

Values $\bar{v}_x$ and $\bar{v}_y$ denote the integral parts of the horizontal and vertical components of the extended motion vector v. The vector $\bar{v}$ is defined as $$\bar{v} = (\bar{v}_x, \bar{v}_y)^T \quad (5)$$

such that location $f = b + \bar{v}$ is a received (decoded) pixel location in field $f_n''$. T refers to the transverse function of linear algebra. Values $\tilde{v}_x$ and $\tilde{v}_y$ denote the fractional parts of the horizontal and vertical components of the extended motion vector v. These values are related by the equations:

$$\tilde{v}_x = v_x - \bar{v}_x \quad (7)$$

$$\tilde{v}_y = v_y - \bar{v}_y \quad (8)$$

Function f(.) is the continuous-space impulse function of a high-pass filter. Using these definitions, the tap weights of the 1-D discrete-space high-pass filter are derived in step 250 using the exemplary equation:

$$h(n) = f(\tilde{v}_y - 2n) \quad (9)$$

The intensity value input to the $n^{th}$ tap of the high-pass filter is interpolated in step 260 using the exemplary equation as:

$$x(n)=(1-\text{abs }(\tilde{v}_x))I_{(b_x+\tilde{v}_x,b_y+\tilde{v}_y+2n)}+\text{abs }(\tilde{v}_x)I_{(b_x+\tilde{v}+sng(\tilde{v}_x),b_y+\tilde{v}_y+2n)} \quad (10)$$

where the function sgn refers to the sign of the value within the parentheses, and abs takes the absolute value within the parentheses.

The high-pass estimate is performed in step 270 by operating the discrete-space high-pass filter h(.) defined above in equation (9) on the interpolated intensity values x(.) as:

$$\hat{I}_b^H = \sum_n h(n)x(n) \quad (11)$$

In step 280, the high-pass estimate from step 270 is combined with the low-pass estimate from step 110, and the combined value is output as the pixel value in step 290.

Figure 7:
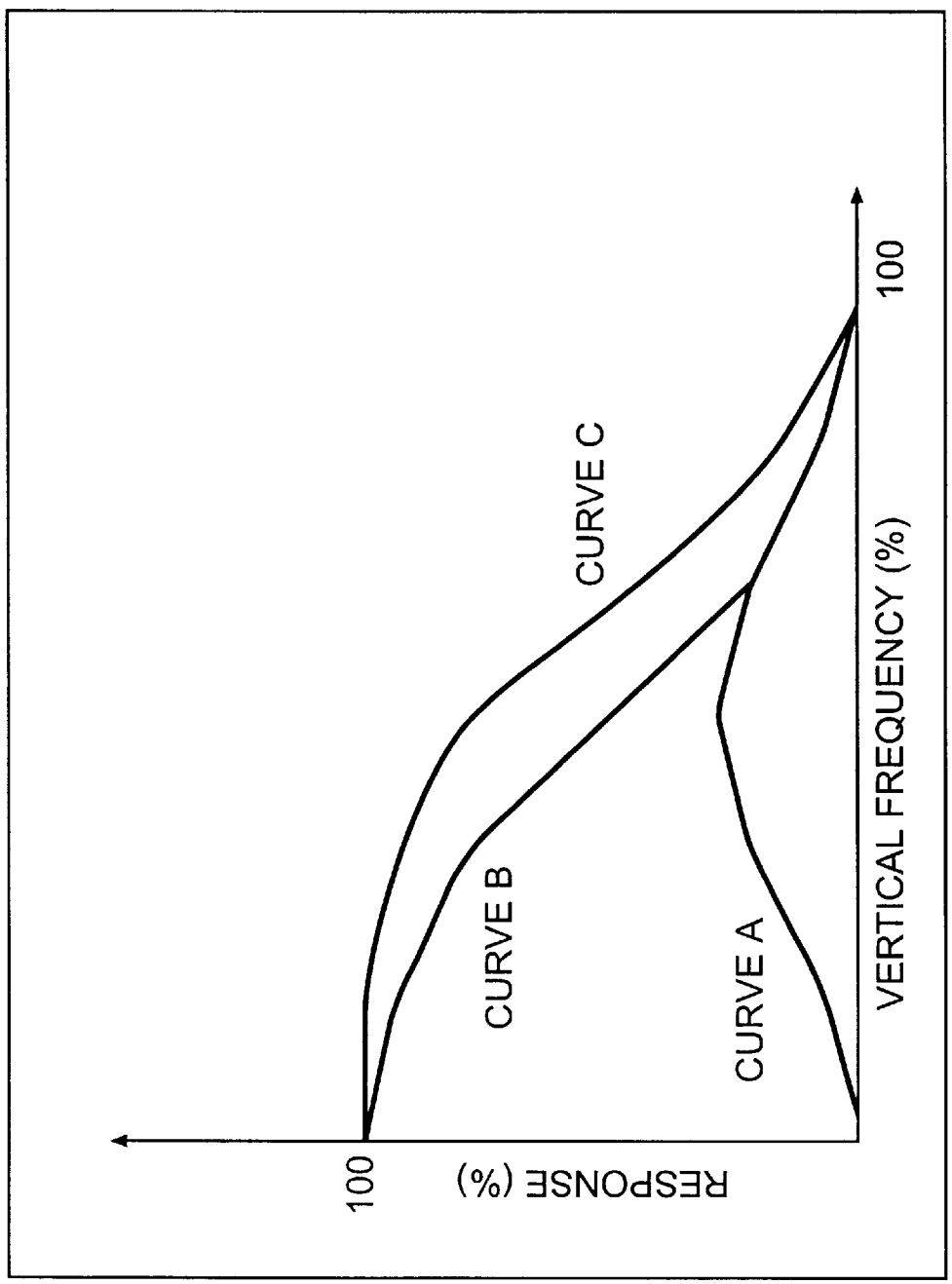
FIG. 7 is a graph showing the results of practicing the present invention.

FIG. 7 shows the value of the response to vertical detail function that results from practicing the above described embodiment. Perfect response is given the value 100%, and is plotted on the y axis of FIG. 7. Vertical Frequency is a value that is shown as a percentage of the maximum definition of which the method is capable in the vertical direction (262.5 cycles/picture height for NTSC). When there is no motion between $f_c$ and $f_n$, the resulting values of response are shown. Curve A, obtained from $f_n t$, shows the response due to the high-pass estimate. Curve B, obtained from $f_c$, shows the response due to the low-pass estimate. Curve C shows the overall response, and is also the closest to 100% response for all values of vertical frequency.

When there is motion between fields $f_c$ and $f_n$, such as a detail occurring at 30 Hz in the temporal direction, combining the response due to the low-pass estimate from $f_c$ with the response due to the high-pass estimate from $f_n$ at the same spatial location (v=0) as suggested in the above cited Weston patent, results in the overall curve dropping below curve C of FIG. 7. This is caused by having the response of the two estimates operating out of phase with each other. The motion compensation of the present invention, with motion vectors corresponding to true motion, keeps the response due to the two estimates in phase with each other. The overall response of the present invention is maintained at curve C even when motion is present. Only when the motion vectors do not correspond to true motion does the overall response drop below that of curve C with consequences not as severe as other motion compensated conversion techniques.

Figure 5:
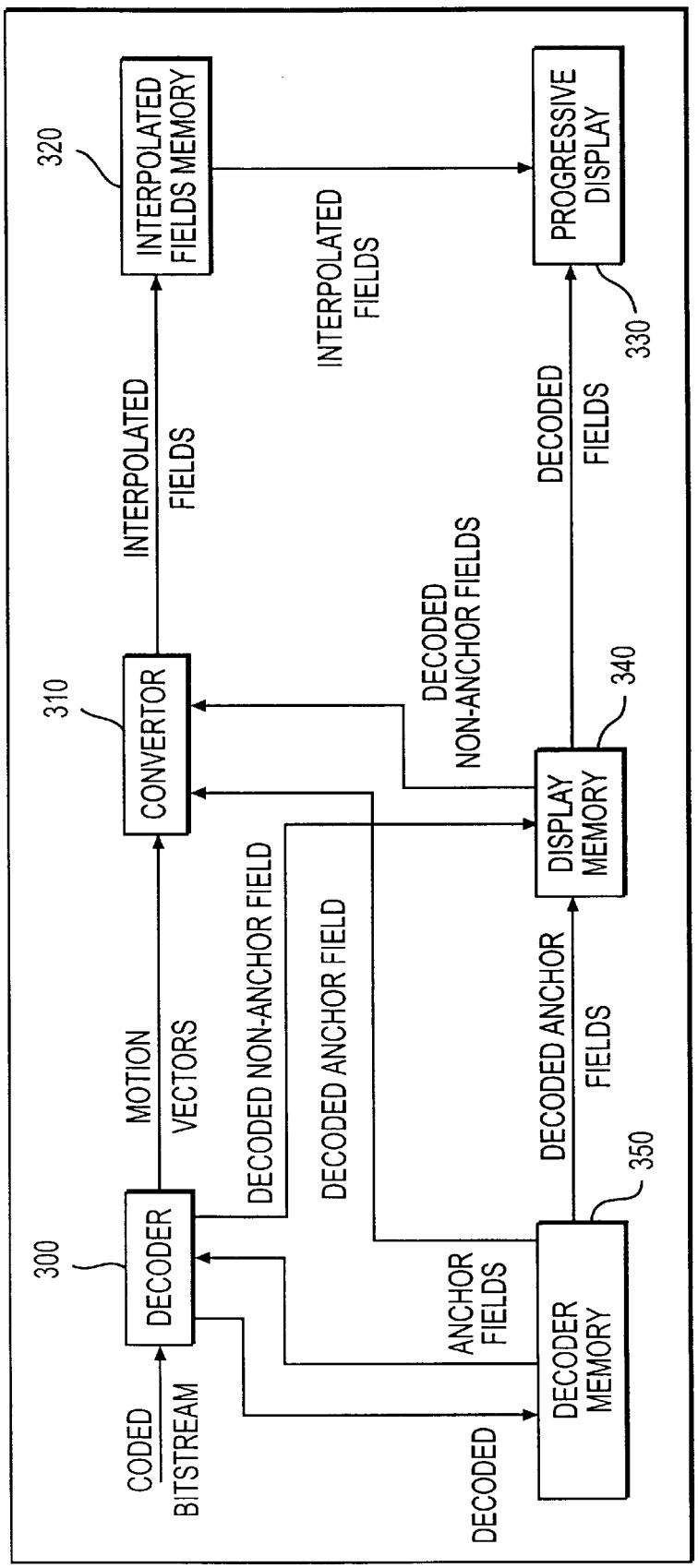
FIG. 5 is a block diagram of a pixel interpolation system in accordance with the present invention.

FIG. 5 shows a block diagram of a pixel interpolation system in accordance with the present invention. This pixel interpolation system includes a decoder 300, a motion vector directed converter 310, an interpolated fields memory 320, a progressive display 330, a display memory 340 and a decoder memory 350.

Decoder 300 is connected to decoder memory 350, motion vector directed converter 310 and display memory 340. Motion vector directed converter 310 is connected to decoder memory 350, interpolated fields memory 320 and display memory 340. Interpolated fields memory 320 is connected to progressive display 330. Progressive display 330 is connected to display memory 340. Display memory 340 is connected to decoder memory 350.

Figure 8:
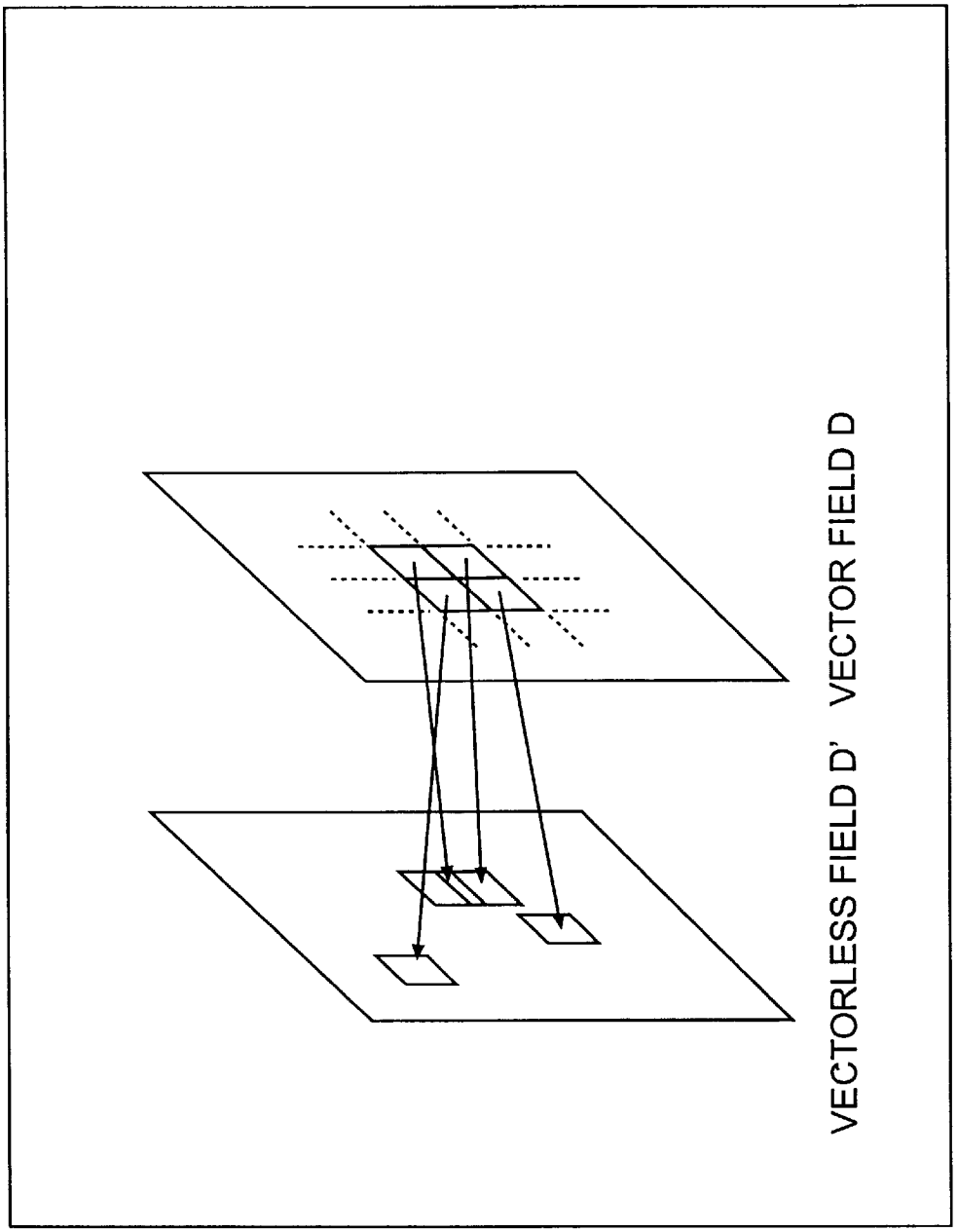
FIG. 8 is a diagram showing how the pixel elements of a temporally local field are connected to the pixel elements of a current field by motion vectors.

The system operates by first having the signal (coded bitstream of interlaced data) input into decoder 300. Decoder 300 decodes the signals to obtain interlaced data and motion vectors. The motion vectors are sent to converter 310. The decoded signal is of two field types, those having motion vectors associated with them called vector fields D, and those without motion vectors associated with them called vectorless fields D'. FIG. 8 shows an example of a vector field D, an example of a vectorless field D' and motion vectors relating the pixels of the two fields. A vector field D or a vectorless field D' further used for the temporal prediction of preceding or subsequent fields, at the time of their decoding, is sent to decoder memory 350.

A vector field D or a vectorless field D' not used for the temporal prediction of other fields is directly sent to display memory 340 from decoder 300. Display memory 340 also accesses interlaced data fields stored in decoder memory 350.

In order to fill in the missing pixels in the decoded data stored in display memory 340, the fields made up of both types of data are sent to motion vector directed converter 310. In the case of vector fields D, motion vector directed converter 310 uses the data contained in vector fields D and the field connected to D by its motion vector v in order to interpolate the missing pixel values of vector field D. In the case of vectorless fields D', motion vector directed converter 310 uses the data contained in vector field D' and the data contained in a vector field D connected to D' by the motion vector of field D in order to interpolate the missing pixels in vectorless field D'.

The interpolated data from both field types is then sent to interpolated fields memory 320. The progressive display 330 accesses one interpolated field stored in interpolated fields memory 320 and the corresponding decoded field at the same temporal instant stored in display memory 340 in order to produce and display a complete frame.

Figure 9:
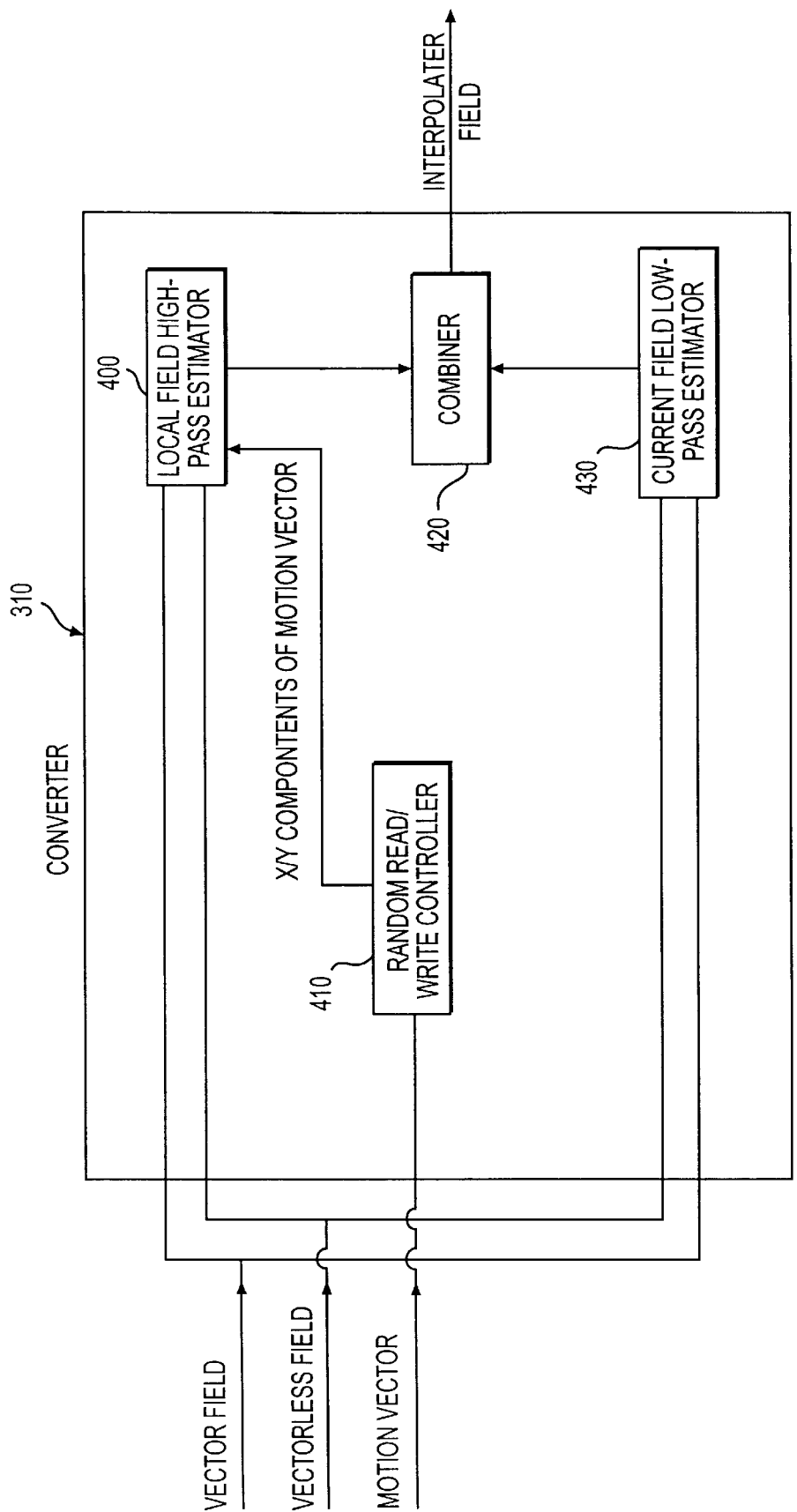
FIG. 9 is a block diagram of a motion vector directed converter in accordance with the present invention.

FIG. 9 shows some exemplary elements of motion vector directed converter 310. Motion vector directed converter 310 includes a local field high-pass estimator 400, a random read/write controller 410, a combiner 420 and a current field low pass estimator 430.

Local field high-pass estimator 400 is connected to random read/write controller 410, and combiner 420. Combiner 420 is connected to current field low-pass estimator 430.

Motion vector directed converter 310 is shown as having three inputs: vector field, which carries decoded interlaced data for vector fields D; vectorless field, which carries decoded interlaced data for vectorless fields D'; and motion vector which carries the data for motion vector v.

Random read/write controller 410 has an input from motion vector and an output to local field high pass estimator 400. Random read/write controller 410 takes motion vector v, and separates it into x, y and time components, and then sends the x, y and time components to local field high-pass estimator 400. Random read/write controller 410 can also extend or contract motion vector v, and send the x, y and time components of extended or contracted motion vector v to local field high pass estimator 400.

Local field high pass estimator 400 has two inputs that provide the data for both vector fields D, and vectorless fields D'. Local field high-pass estimator 400 uses the time component of motion vector v to select a local field (D or D') in which to perform a high pass estimate. Local field high-pass estimator 400 uses the x and y components of motion vector v to select a location within the local field to use as the center of the high-pass estimate. Local field high-pass estimator 400 then performs a high-pass estimate within the local field at the selected location, and outputs high-pass estimate to combiner 420.

Current field low-pass estimator 430 has two inputs that provide the data for both vector fields D, and vectorless fields D'. Current field low-pass estimator uses the data for the current field in order to perform a low-pass estimate for each missing pixel, and then outputs the low-pass estimate to combiner 420.

Combiner 420 combines the low-pass estimate and high pass estimate using appropriate weights, and outputs the combined data set as an interpolated field.

It will be apparent to those skilled in the art that various modifications and variations can be made in the method of the present invention and in construction of the pixel interpolating system without departing from the scope or spirit of the invention. It is intended that the specification and example be considered as exemplary only, with a true scope and spirit of the invention being indicated by the following claims.

What is claimed is:

1. A method of interpolating a value of a missing pixel from an interlaced format video signal, comprising the steps of:

performing a low-pass estimate in a current field centered at the missing pixel;

using a motion vector pointing to or from the missing pixel to find a pixel location of a temporally local field;

performing a high-pass estimate in the temporally local field centered at said pixel location of the temporally local field;

combining said low-pass estimate with said high-pass estimate to determine a combined estimate; and using said combined estimate as the value of the missing pixel.

2. The method of claim 1 wherein the motion vector is included in the video signal, said method further comprising the steps, after the step of performing a low pass estimate, of:

decoding the motion vector from said interlaced format video signal;

determining if the motion vector is reliable;

continuing if the motion vector was reliable, to the step of performing said high pass estimate; and estimating, if a reliable motion vector was not calculated, the value of the missing pixel.

3. The method of claim 1 further comprising steps, after the step of using the motion vector of:

determining if the pixel location of the temporally local field is a missing pixel;

estimating, if the pixel location of the temporally local field is a missing pixel, the value of the missing pixel of the current frame; and continuing, if the pixel location of the temporally adjacent field is not a missing pixel, to the step of performing a high-pass estimate.

4. A method of interpolating a value of a missing pixel from an interlaced format video signal comprising the steps of:

performing a low-pass estimate in a current field centered at the missing pixel;

locating a motion vector that relates a first location in a first temporally local field and a second location in a second temporally local field;

scaling said motion vector to form a scaled motion vector, said scaled motion vector relating the missing pixel to a third location in a third temporally local field;

obtaining a high-pass estimate using a high-pass filter having tap weights;

combining said high pass estimate with said low pass estimate; and using said combination as an interpolated pixel value.

5. The method of claim 4, wherein said step of obtaining a high-pass estimate includes the steps of:

calculating a distance between said third location within said third temporally local field and a received pixel within said third temporally local field;

calculating said tap weights based on said distance;

interpolating intensity values to input into said high-pass filter from pixels surrounding said third location within said third temporally local field and said received pixel.

6. A method of interpolating a value of a missing pixel from an interlaced format video signal comprising the steps of:

performing a low-pass estimate in a current field centered at the missing pixel;

locating a motion vector that relates pixel locations in a first and second field;

scaling said motion vector;

using said motion vector to relate the missing pixel to a location in a third field;

obtaining a high-pass estimate using a high-pass filter in said third field;

combining said high pass estimate with said low pass estimate; and using said combination as an interpolated pixel value.

7. A system for interpolating a missing pixel from an interlaced format video signal having a decoder, a decoder memory, a display memory, a converter, an interpolated fields memory, and a progressive display, wherein the converter comprises:

a random read/write controller;

a local field high-pass estimator coupled to said random read/write controller;

a combiner coupled to said local field high-pass estimator; and a current field low-pass filter coupled to said combiner;

wherein said local field high-pass estimator is programmed to perform a high-pass estimate at a pixel location connected to said missing pixel by a motion vector.

8. An interlaced to progressive video format converter comprising:

a local field high-pass filter for performing a high-pass estimate at a location connected to a missing pixel by a motion vector;

a current field low-pass filter for performing a low-pass estimate at a missing pixel location; and a combiner having said high-pass estimate and said low-pass estimate as input values for combining said high-pass estimate and said low-pass estimate to provide an interpolated value of said missing pixel.

9. A system for interpolating a missing pixel from an interlaced format video signal, comprising:

a decoder for decoding an interlaced format video signal having missing pixels;

a decoder memory coupled to said decoder for storing the output of said decoder;

a display memory coupled to said decoder and said decoder memory for storing pixel values of interlaced format video signal;

a converter coupled to said decoder, said decoder memory and said display memory for converting said interlaced format video signal having missing pixels into a video signal without missing pixels, said converter having an intra-field low-pass filter and a motion vector directed local field high-pass filter;

an interpolated fields memory coupled to said converter for storing pixel values of interpolated fields of missing pixels; and a progressive display coupled to said interpolated fields memory and said display memory for displaying a video signal.

* * * * *